(12) United States Patent
Weyrauch

(10) Patent No.: US 10,994,911 B2
(45) Date of Patent: May 4, 2021

(54) PALLET CONTAINER INCLUDING AN INLINER

(71) Applicant: MAUSER-WERKE GMBH, Bruehl (DE)

(72) Inventor: Detlev Weyrauch, Kreuzau-Untermaubach (DE)

(73) Assignee: MAUSER-WERKE GMBH, Bruehl (DE)

( * ) Notice: Subject to any disclaimer, the term of this patent is extended or adjusted under 35 U.S.C. 154(b) by 214 days.

(21) Appl. No.: 16/086,027

(22) PCT Filed: Sep. 15, 2016

(86) PCT No.: PCT/EP2016/001548
§ 371 (c)(1),
(2) Date: Sep. 18, 2018

(87) PCT Pub. No.: WO2017/162259
PCT Pub. Date: Sep. 28, 2017

(65) Prior Publication Data
US 2020/0290788 A1    Sep. 17, 2020

(30) Foreign Application Priority Data

Mar. 24, 2016 (DE) .................... 20 2016 001 876.1

(51) Int. Cl.
*B65D 77/06* (2006.01)
*B65D 77/04* (2006.01)

(52) U.S. Cl.
CPC ....... *B65D 77/061* (2013.01); *B65D 77/0466* (2013.01); *B65D 77/068* (2013.01);
(Continued)

(58) Field of Classification Search
CPC ........ B65D 19/00; B65D 19/02; B65D 19/10; B65D 77/04; B65D 77/0466; B65D 77/06;
(Continued)

(56) References Cited

U.S. PATENT DOCUMENTS 5,058,747 A * 10/1991 Decroix ............. B65D 77/0466
206/386
7,897,223 B2 * 3/2011 Schubbach ............. B32B 27/20
206/386

(Continued)

FOREIGN PATENT DOCUMENTS

CA    2543309 A1 * 11/2006 ........... B65D 77/061
CN    1066036 A    11/1992
(Continued)

OTHER PUBLICATIONS

Search Report, State Intellectual Property Office of People's Republic China, CN Application No. 201680083917.X, dated Sep. 10, 2019.
International Search Report for International Application No. PCT/EP2016/001548, dated Nov. 25, 2016.

*Primary Examiner* — Bryon P Gehman
(74) *Attorney, Agent, or Firm* — Marshall, Gerstein & Borun LLP

(57) ABSTRACT

A pallet container (10). having a thin-walled rigid internal container (12) including a thermoplastic plastics material, a tubular lattice frame (14), as a supporting jacket tightly enclosing the plastics-material internal container (12), and a rectangular base pallet (16) on which the plastics-material internal container (12) bears and to which the tubular lattice frame (14) is fixedly connected. cuboid plastics-material internal container (12) has a protective-housing-shaped molding (26 and a cuboidal flexible inliner (28) including a plastics-material film is inserted in the rigid plastics-material internal container (12), the inliner at the top being connected (Continued)

to the filling connector (30) and at the bottom being connected to the removal connector (32) with removal fitting (24) of the rigid plastics-material internal container (12). The cuboid-shaped flexible inliner (28) in the lower removal region has a corresponding wall recess (34)—having a flexible removal connector (42) molded thereon.

13 Claims, 4 Drawing Sheets

(52) U.S. Cl.
CPC .............. *B65D 2519/00034* (2013.01); *B65D 2519/00164* (2013.01)

(58) Field of Classification Search
CPC ................ B65D 77/061; B65D 77/068; B65D 2519/00034; B65D 2519/00164
USPC ..................................... 206/386; 220/9.1–9.4
See application file for complete search history.

(56) References Cited

U.S. PATENT DOCUMENTS

| | | | |
|---|---|---|---|
| 2013/0233912 A1* | 9/2013 | Piotrowski | B65D 71/0085 229/117.3 |
| 2016/0001921 A1* | 1/2016 | Siebel | B65D 19/10 206/386 |
| 2016/0001951 A1 | 1/2016 | Siebel | |

FOREIGN PATENT DOCUMENTS

| | | |
|---|---|---|
| CN | 2863717 Y | 1/2007 |
| DE | 202014007695 U1 | 11/2014 |
| EP | 0415719 A1 | 3/1991 |
| EP | 2090528 A1 | 8/2009 |
| JP | 2005289464 A | 10/2005 |
| WO | WO-2007029011 A1 | 3/2007 |
| WO | WO-2011002925 A2 | 1/2011 |

* cited by examiner

PALLET CONTAINER INCLUDING AN INLINER

CROSS-REFERENCE TO RELATED APPLICATION

This is the United States national phase of International Patent Application No. PCT/EP2016/001548, filed Sep. 15, 2016, which claims priority to German Application No. 20 2016 001 876.1, filed Mar. 24, 2016, the entire contents of each of which are incorporated herein by reference.

FIELD OF THE DISCLOSURE

The invention relates to a pallet container (IBC) for storing and for transporting liquid or free-flowing filling materials, having a thin-walled rigid internal container from a thermoplastic plastics material, having a tubular lattice frame, as a supporting jacket tightly enclosing the plastics-material internal container, from welded-together horizontal and vertical tubular bars, and having a rectangular base pallet on which the plastics-material internal container bears and to which the tubular lattice frame is fixedly connected, wherein the rectangular plastics-material container has two longer side walls, a shorter rear wall, a shorter front wall, an upper base having a closable filling connector and a container base, wherein on the base side, in the center of the front wall, a lower removal region having a protective-housing-shaped molding (hereunder synonymously also referred to as "removal fitting protective housing"), directed inward toward the inside of the plastics-material container, for disposing a closable removal fitting in a protected recessed manner is provided, and wherein a likewise cuboidal flexible inliner (hereunder alternatively also referred to as a "film bag") is inserted in the rigid plastics-material internal container, said inliner at the top being connected to the filling connector and at the bottom being connected to the removal connector with removal fitting of the rigid plastics-material internal container.

BACKGROUND

Pallet containers, or IBCs, respectively, are extensively used in the chemical industry, mainly for transporting liquid chemicals. The majority of these chemical products is classified as hazardous liquid filling material because they are a risk to the health of humans and animals and to the environment in a concentrated form. During storage and transportation in IBCs, the chemicals may stress, such as discolour, contaminate, or damage, the HDPE material of the plastics-material internal containers in such a manner that the used internal containers cannot simply be washed and reused. In the case of a usual multiple use of used IBCs, the only remaining option is the replacement of the damaged plastics-material internal container with a new internal container. Considering that a plastics-material internal container, depending on the list of requirements, may weigh approx. 14 kg to 18 kg, this however represents a costly solution involving a not insignificant waste of plastics material. Another more cost-effective solution lies in protecting the plastics-material internal container by means of an inserted thin inliner, or film bag, respectively, against any contamination by the respective filling material, and on account thereof enabling multiple reuse or repeated use, respectively, of the internal container. In this instance, only the contaminated inliner needs to be disposed of, said inliner for a 1000 liter IBC, depending on the film thickness, merely having a weight of approx. 0.7 to 1.3 kg in terms of the plastics-material mass thereof, and a new inliner has to be inserted in order for the IBC to be reused.

Inserting thin-walled film bags, or inliners, respectively, into rigid box-shaped external containers, such as large rigid cardboard boxes or cardboard sleeves (referred to as bag in box) is a measure that has been usual for years. However, only cylindrical, cuboid, or cushion-shaped inliners of simple construction have always been available for square-shaped or rectangular-shaped external containers. Said inliners may be used without problems for containers that have an externally located removal system. Said simple inliners cannot readily be used for pallet containers, or IBCs, respectively, having blow-molded stiff or rigid plastics-material internal containers, respectively, having a protective housing that is molded inwardly into the internal container for a recessed removal fitting that is protected from external influences, because they during handling in the case of installation, filling, removal, and removal from the rigid IBC internal container consistently lead to problems. There is in particular inevitably a formation of creases in the region about the lower removal connector.

The use of a thin film-like inliner in a rigid plastics-material internal container having a molded protective housing for the removal fitting of a usual pallet container is known from publication EP 2 090 528 A1 (Pro/Sch). The focus herein, inter alia, is on securely fixing the thin-walled inliner removal connector in the rigid removal connector of the plastics-material internal container with the aid of the screwed-on removal fitting. In this case, the front periphery of the thin tubular film, using a sealing flange and a sealing lip, is jammed at the end side by an annular shoulder in the housing screw nut of the removal fitting on the threaded sleeve (having an external thread) that is welded to the bottle removal fitting. However, when the housing screw nut is placed ready for screwing, the periphery of the thin tubular film that is folded over can no longer be tightly held and no longer be seen; said folded-over periphery may easily slide out of place herein or even be imparted creases. Small pimples on the film periphery and respective depressions in the end wall of the threaded sleeve are intended to counteract this. In any case, fixing and securing the inliner removal connector against rotation is performed only by clamping, once the thread of the housing screw nut has been completely tightened. It has to be ensured at the same time that the opening lever of the removal fitting is exactly in the vertical position.

In the case of another large container that is known from U.S. Pat. No. 6,55,657 B1 (Var), the undesirable formation of creases in the region of the protective housing of the removal fitting within the plastics-material internal container has been identified as disadvantageous, and the thin-walled removal connector of the inliner as a supposedly suitable countermeasure has not been positioned in the base-side proximity of the inliner front wall but rather close to the front-side periphery of the lower base of the cuboid-shaped inliner. Upon insertion of the inliner into the rigid internal container of the IBC, the front-side periphery of the lower base is then folded up in a rectangular manner, and the thin-walled removal connector of the inliner is guided through the rigid removal connector of the internal container and fixed. On account thereof however, the inliner cannot bear on the front wall of the internal container in a fully planar manner, and free spaces or cavities, respectively, remain below the inliner, laterally next to the protective housing of the internal container. As the filling of the IBC is increased, the inliner is of course pressed onto the protective housing and, laterally next thereto, onto the base of the rigid internal container. Herein, the inliner is here too inevitably withdrawn from the lateral corner regions of the rigid internal container, and the formation of creases by the thin-walled inliner arises here too, even if this arises rather toward either side and no longer directly in front of the outlet opening of the removal connector. The problem of the formation of creases is thus also not completely solved here either.

In the case of all known IBCs, the thin-walled inliners by way of the lower flexible removal connector thereof are fastened to the lower rigid removal connector and at the top by way of the flexible filling connector of the former to the upper rigid filling connector of the plastics-material internal container, otherwise being freely suspended from top to bottom. When filling the pallet container, irrespective of this being from the top or from below in the case of a so-called "base filling", the liquid filling material is most often filled into the inliner at still increased process temperatures under pressure, or by way of a sharp jet. Intense fluttering of the film material often arises herein. The inliner base is withdrawn from the container corners, forming creases which later may block the base-side removal opening during a removal of filling material. Depending on the filling level, the inliner together with the liquid content thereof by virtue of the external transportation rocking motions acting thereon wobbles back and forth in the plastics-material internal container such that tensile stresses that are often variable act on the upper filling connector of the inliner, the film material potentially ripping. In order to obviate this phenomenon, expensive stress-resistant film materials have to be used in the production of the inliner. Composite films having advanced barrier properties unfortunately have only a very poor resistance to stress, and cannot be employed in many applications.

GENERAL DESCRIPTION

The present invention is based on the object of facilitating the use of inliners in pallet containers (IBCs), and in particular of avoiding with high reliability a formation of creases by the inliner in the interior of the rigid internal container.

This object is achieved by the special features of patent claim 1. The features in the dependent claims describe further advantageous potential design embodiments of the pallet container according to the invention. The proposed technical teaching opens up improved handling safety of IBC with inliners that are form-adapted for use in IBCs with blow-molded plastics-material internal containers having a protective housing, inwardly molded in the internal container, for disposing the removal fitting in a protected recessed manner within the external lattice cage of the pallet container. It has been established that customers do not want it and refuse any further use of thin-walled inliners in IBCs when leakages of the inliner and disruptions in the removal of filling material often arise by virtue of the formation of creases by the inliner that clog the removal connector of the internal container.

An asset protection of high-value and multi-use-capable plastic-material internal containers is enabled by the constructive measures of the present invention by way of the disruption-free use of cost-effective inliners or film bags, respectively, such that no more unnecessary material wastage occurs in terms of valuable blow-molded plastics-material internal containers.

This is caused in an effective manner in that the cuboid-shaped flexible inliner in the lower removal region has a wall recess, directed inward and adapted to the protective-housing-shaped molding of the rigid plastics-material container, having two lateral wall parts, an upper wall part, and a rearward wall part having a flexible removal connector molded thereon, and is configured so as to bear in an exact fit on the internal surface of the molding of the removal fitting protective housing that protrudes into the interior of the rigid plastics-material container. On account thereof, there are no cavities below or laterally next to the still empty inliner base, that during continuous filling of known IBCs with liquid filling material are always filled, inevitably leading to distortions of the inliner and to the formation of creases by the latter.

In a constructive design embodiment of the invention it is expediently provided herein that the cuboid-shaped flexible inliner is welded together from three blank panels, and to this end comprises an upper horizontal lid part having a centric flexible filling connector, a lower horizontal base part having a clearance that corresponds with the base shape of the wall recess, and a vertically encircling side-wall blank panel having area portions for the two lateral wall parts, as well as the upper wall part, and the rearward wall part of the wall recess of the inliner.

In a production-technology related design embodiment of the invention it is provided that the three blank panels in each case are welded together by way of a weld seam that horizontally encircles the external edge of the upper lid part and the external edge of the lower base part, and for closing the side-wall blank panel are welded together by way of a weld seam that runs vertically from top to bottom in the center of the front wall and through the center of the wall recess.

In another preferred production-technology related design embodiment of the invention it is provided that the three blank panels in each case are welded together by way of a weld seam that horizontally encircles the external edge of the upper lid part and the external edge of the lower base part, and for closing the side-wall blank panel are welded together by way of a weld seam that runs vertically from top to bottom in the center of the rear wall, wherein a weld waste running vertically from top to bottom up to the wall recess, for removing excess film portion above the wall recess, is provided in the center of the front wall. In the production of inliners having a weld waste, the weld seam of the weld waste advantageously does not run through the upper and rearward wall part of the wall recess of the inliner. The position of the welded annular-disk-shaped flange periphery of the flexible inliner removal connector is then also free from a vertical weld seam running therethrough.

Surprisingly, in the inliner according to the invention, the length of the upper horizontal weld seam is configured so as to be shorter than the length of the lower horizontal weld seam, or the upper weld seam circumference of the upper lid part is configured so as to be shorter than the lower weld seam circumference of the lower base part, and the front-side vertical weld seam of the side-wall blank panel is configured so as to be longer than the height of the inliner cuboid. This is enabled by integrating the area portions for the two lateral wall parts and for the upper and the rearward wall part of the wall recess of the inliner into the vertically encircling side-wall blank panel. This indeed necessitates somewhat more cutting waste in terms of film material, and a curved weld seam in the upper and rearward wall part of the wall recess, but this does save complex welding of four individual small wall parts of the wall recess.

According to one particularly preferred process-technology related embodiment of the invention it is provided that the inliner after insertion and welding to the rigid filling connector and removal connector of the plastics-material internal container is inflated using compressed air, and excess air is removed without residue by vacuum pumps from the intermediate space between the external surface of the inliner and the internal surface of the plastics-material internal container until no air and no intermediate space remains between the inliner and the plastics-material internal container such that a stable vacuum is set, said vacuum, upon gas-tight closure of the container opening by way of which the excess air has been evacuated, being durably maintained during the entire intended use of the pallet container until the next replacement of the used inliner. This extraordinary handling friendliness of the pallet containers according to the invention is achieved in that the flexible inliner by way of the upper filling connector thereof is welded in a materially integral manner to the upper filling connector of the rigid plastics-material internal container, and by way of the lower thin-walled removal connector thereof is welded in a materially integral manner to the lower removal connector of the rigid plastics-material internal container, in each case in a gas-tight and liquid-tight manner, while the entire external surface of the inserted inliner is operatively connected to the entire internal surface of the plastics-material internal container and is connected to the latter in a force-fitting manner. On account thereof it is precluded with utmost reliability that creases continue to be able to be formed in front of the lower removal connector in the inliner. The inliner sits like a second skin in the plastics-material internal container, so to speak. In order to enable vacuum pumping, an additional container opening is disposed at any suitable location in the upper base. The container opening is preferably embodied as a 2-inch spout opening, which is closable in a gas-tight and liquid-tight manner by way of a 2-inch spout plug, preferably having an inbuilt one-way valve. A vacuum/compressed-air pump is connected to the container opening on demand.

BRIEF DESCRIPTION OF THE DRAWINGS

The invention will be explained and described in more detail hereunder by means of an exemplary embodiment that is schematically illustrated in the drawings. In the drawings.

DETAILED DESCRIPTION

Figure 1:
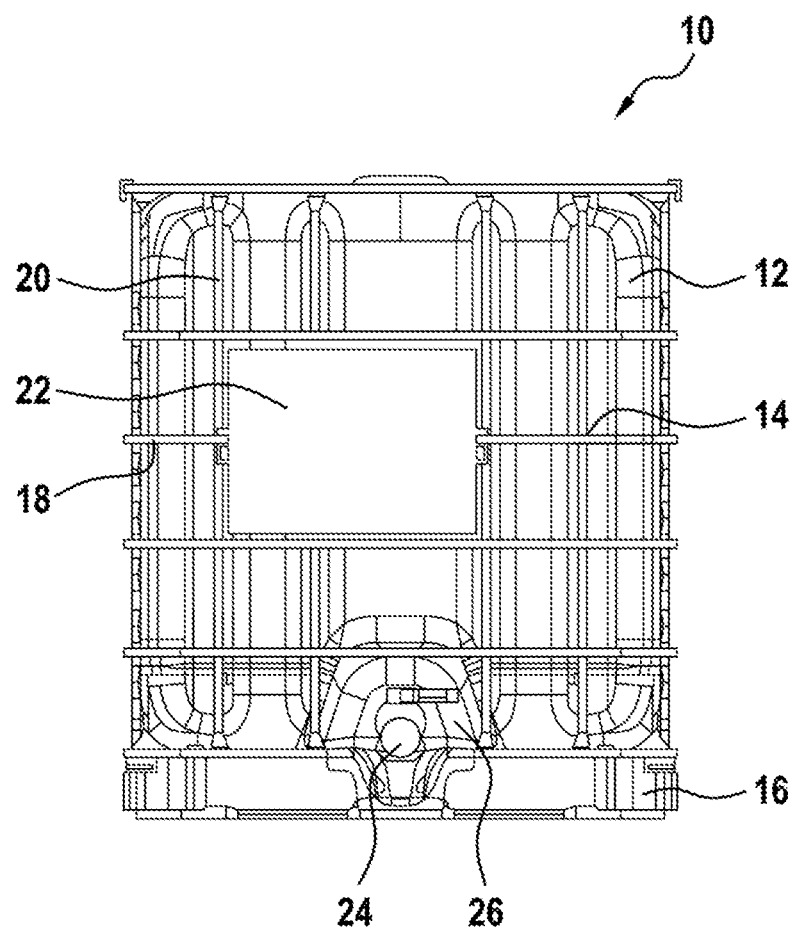
FIG. 1 shows a front view of an IBC according to the invention having an inserted inliner.

A pallet container according to the invention (=IBC) for storing and for transporting in particular hazardous liquid or free-flowing filling materials is identified by the reference sign 10 in FIG. 1. For employment, or for use, respectively, in the context of hazardous filling materials, the pallet container 10 meets particular testing criteria, and is provided with a respective official classification. In an embodiment for a filling material volume of approx. 1000 l, the pallet container 10 has standardized dimensions, having a length of approx. 1200 mm, a width of approx. 1000 mm, and a height of approx. 1151 mm. The salient elements of the pallet container 10 are composed of a thin-walled rigid internal container 12 that is produced by the blow-molding method from a thermoplastic plastics material, of a tubular lattice frame 14 that as a supporting jacket tightly encloses the plastics-material internal container 12, and of a base pallet 16 on which the plastics-material internal container 12 bears and to which the tubular lattice frame 14 is fixedly connected. The external tubular lattice frame 14 is composed of welded-together horizontal and vertical tubular bars 18, 20. In order for a closed lattice cage to be obtained as an external container, the horizontal tubular bars 18 that run in an annular encircling manner each are fixedly interconnected at a connection point. The base pallet 16 in the illustrated version is configured as a composite pallet having an upper steel-sheet support plate, having a tubular steel support frame disposed therebelow, and having plastics-material corner and central feet. A labeling plate 22 from thin steel sheet, for identification of the respective liquid filling material, is fixed on the front side of the tubular lattice frame 14. A removal fitting 24 for retrieving the liquid filling material is connected in the center of the base of the plastics-material internal container 12.

In a manner corresponding to the dimensions of the pallet container 10, the plastics-material internal container 12 has two longer side walls, a shorter rear wall, a shorter front wall, an upper base having a closable filling connector 30, and a container base, wherein on the base side in the center of the front wall a lower removal region having a protective-housing-shaped molding, directed inward toward the inside of the plastics-material internal container 12, for disposing the closable removal fitting 24 in a protected and recessed manner is provided. In order for the rigid plastics-material internal container 12 to be protected against contamination by the filled filling material, and in order for multiple reuse of the valuable internal container to be enabled, a thin-walled likewise cuboid-shaped flexible inliner 28, or a film bag, according to a previous designation, is inserted into the rigid plastics-material internal container 12 prior to each new filling of the pallet container 10, which inliner 28 is connected at the top to the filling connector 30 and at the bottom to the removal connector 32 of the rigid plastics-material internal container 12.

Figure 2:
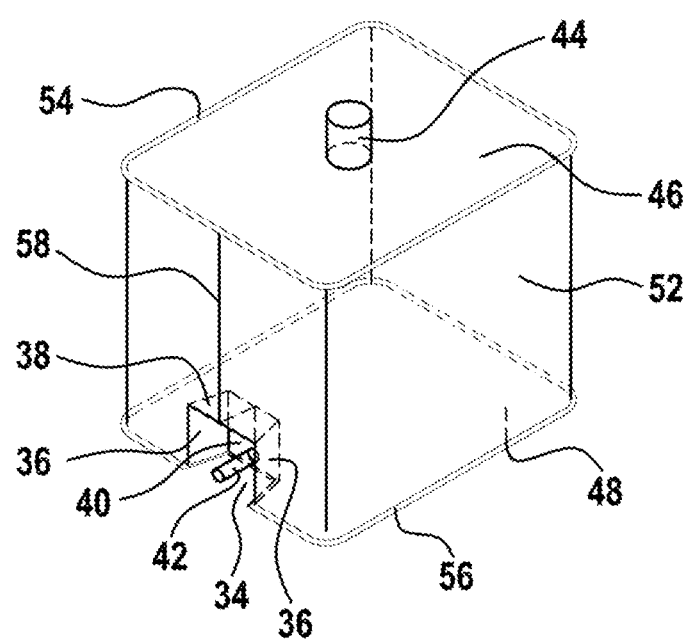
FIG. 2 shows a perspective view of the inserted inliner.

This cuboid-shaped flexible inliner 28 is schematically illustrated per se (without the enclosing plastics-material internal container 12) in FIG. 2. As opposed to the rigid plastics-material internal container 12 which during handling thereof in any case remains dimensionally stable, the inliner 28 by virtue of the thin-wall construction thereof, is not dimensionally stable per se, but is very flexible, yielding, and adaptable. The wall thickness of the usually multi-layered inliner composite film is approx. 100-150 μm, having a mass-per-unit-area of approx. 100-150 g/m$^2$; this results in a material weight of approx. 0.7-1.3 kg for a 1000 l inliner bag. The inliners employed are typically produced from a multi-layered plastics-material composite film. Herein, the wafer-thin composite layers may be composed of various materials such as, for example, HDPE or LDPE/EVOH/PET/PA/bonding agents/SiOx, and/or be provided with a glass-fiber or woven-fabric reinforcement. Depending on the type of application, the composite film is equipped with barrier layers against the diffusion of hydrocarbons, oxygen, or water vapor, or with an aseptic antibacterial coating, or a vapor-deposited metal foil containing silver or aluminum.

According to the present invention, the cuboid-shaped flexible inliner 28 is distinguished in that the latter in the forward lower removal region has a wall recess 24, directed inward and adapted so as to correspond with the protective-housing-shaped molding 26 of the rigid plastics-material container 12, having two lateral wall parts 36, an upper wall part 38, and a rearward wall part 40 having a flexible removal connector 42 molded thereon, and is configured so as to bear completely in an exact fit on the internal surface of the molding 26 that protrudes in a protective-housing manner into the interior of the rigid plastics-material container 12. For reasons of improved clarity, this wall recess 34 of the inliner 28 herein is illustrated as being very box-shaped. Of course, the walls and wall transitions may also be configured so as to be heavily rounded, flattened and/or mutually transitioning, but in any case so as to be adapted to the respective protective-housing-shaped molding 26 of the rigid plastics-material internal container 12.

Figure 3:
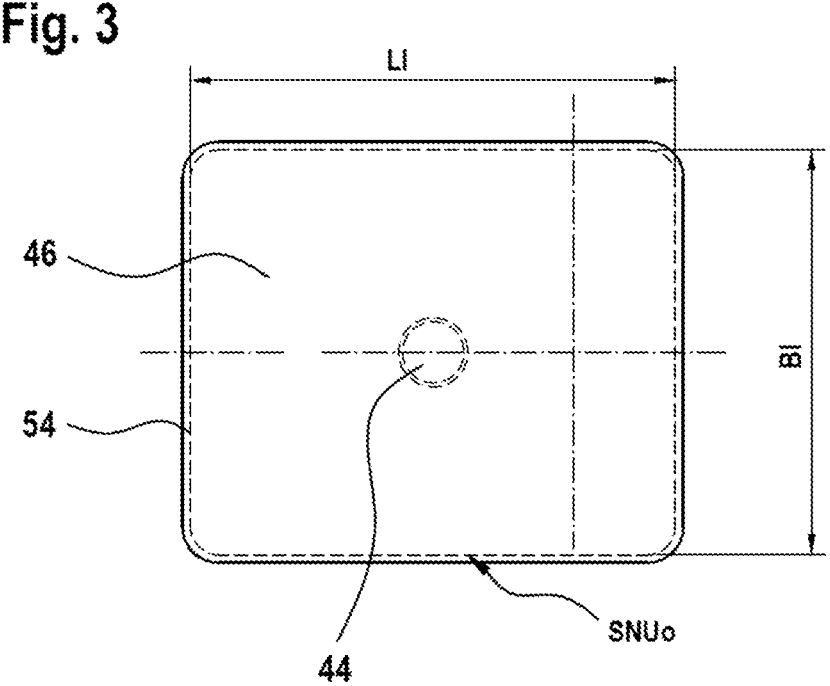
FIG. 3 shows a plan view of an upper-base blank panel of the inliner.
Figure 4:
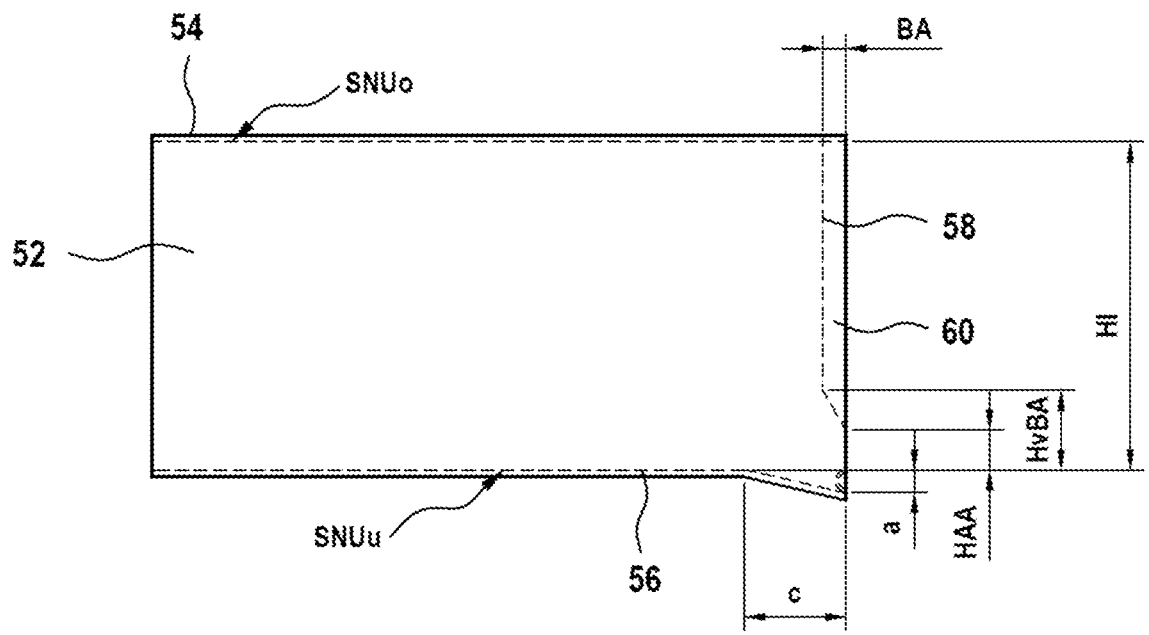
FIG. 4 shows a plan view of a vertical wall blank panel of the inliner.
Figure 5:
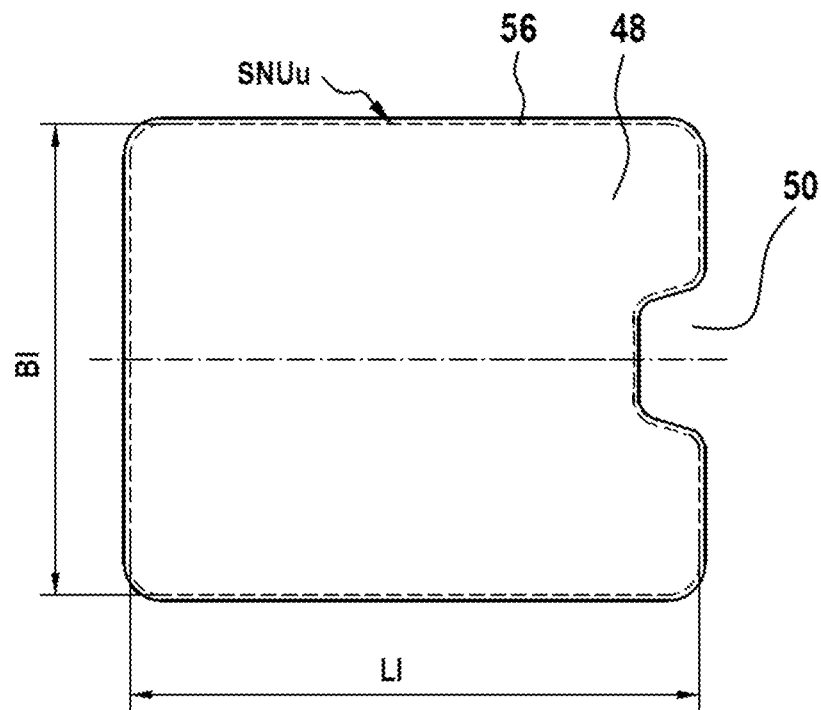
FIG. 5 shows a plan view of a lower-base blank panel of the inliner.

The flexible inliner 28 for a usual 1000 l pallet container has a cuboid-shaped design, having a length LI of approx. 1150-1190 mm, a width BI of approx. 950-990 mm, and a height HI of approx. 950-1050 mm. The length measurements should be exactly adhered to within a positive/negative tolerance (+/−) of 2 mm. In terms of production technology, the cuboid-shaped flexible inliner 28 is welded together from three blank panels. These three blank panels are composed of an upper horizontal lid part 46, having the centric flexible filling connector 44 as can be seen in FIG. 3, a lower horizontal base part 48, having a clearance 50 that corresponds to the base shape of the wall recess 34, as can be seen in FIG. 5, and a vertically encircling side-wall blank panel 52, having area portions for the two lateral wall parts 36, and the upper wall part 38 and the rearward wall part 40 of the wall recess 34 of the inliner 28, as is illustrated in FIG. 4. The three blank panels are welded together by way of two weld seams 54, 56 that horizontally encircle the external edge of the upper lid part 46 and the external edge of the lower base part 48, and for closing the side-wall blank panel 52 are welded together by way of a weld seam 58 that runs vertically from top to bottom in the center of the front wall and through the center of the wall recess 34.

After completion of the inliner 28 from the three blank panels, the length of the upper horizontal weld seam 54, that is to say the upper weld seam circumference SNUo is approx. 4100-4150 mm, the length of the lower horizontal weld seam 56, that is to say the lower weld seam circumference SNUu is approx. 4265-4310 mm, and the front-side vertical weld seam 58 is approx. 800-1100 mm for an inliner for a filling material volume of approx. 1000 l.

The side-wall blank panel 52 illustrated in FIG. 4 is laid up in a doubled manner and at the bottom has two triangular wedges of c=320×a=70 mm; a double strip of 70×875 mm is "waste-welded" above the recess 34. The start of the weld waste is located at a height HAA of 0-130 mm from the lower weld seam. The weld waste from there initially runs in an oblique manner, rising at an acute angle, until said weld waste reaches the full width of 70 mm at a height HvBA of 240-440 mm from the lower weld seam. This weld waste 60 is removed and only represents cutting waste. However, this is necessary in order for the curved contour of the molding 26 in the blow-molded plastics-material internal container 12 to be mimicked. However, a tubular film having a constant height of 1070 mm plus 2× the weld-seam periphery may be used too. This would result in a simpler blank geometry, with approximately identical consumption of material due to weld waste. Once the weld waste 60 has been performed in the vertical wall blank 52, or in the tubular film, respectively, while configuring the curved inliner wall recess 34, the flexible removal connector 42 by way of a smaller welded annular flange 66 is fixedly welded onto the rearward wall part 40, and a corresponding passage opening is cut out. Likewise, the upper flexible filling connector 44 is by way of a welded annular flange 68 that is larger in terms of diameter is centrically and fixedly welded onto the upper horizontal lid part 46, and a corresponding larger passage opening is cut out. Thereafter, the side-wall blank panel 54 including the flexible removal connector 42 by way of the upper weld seam 54 is then welded to the lid part 46 including the flexible filling connector 44, and the base part 48 by way of the lower weld seam 56 in a final operative step is welded to form the finished inliner.

Prior to the inliner 28 being inserted into the rigid plastics-material internal container 12, the upper filling connector 44 of the flexible inliner should have a diameter of approx. 145 mm or 225 mm, and a length of approx. 290-310 mm, and the lower flexible removal connector 44 should have a diameter of approx. 2", 3", or 145 mm, and a length of at least 100 mm. After insertion of the inliner 28 into the rigid plastics-material internal container 12, the filling connector (44) and the removal connector (42) of the flexible inliner 28 each are folded over the filling connector (30) and the removal connector (32) of the rigid plastics-material internal container 12, push-fitted there over, welded thereto in a tensile-force-and tension-force-free manner, and then cut to the appropriate length.

Figure 6:
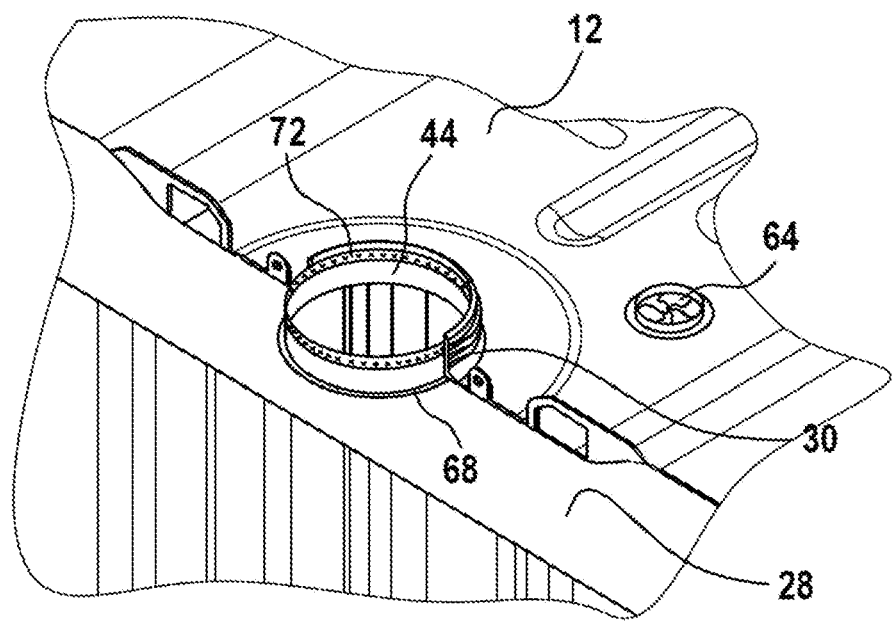
FIG. 6 shows a perspective view of a partial section around the region of the upper filling opening of the plastics-material internal container.

The filling region of the plastics-material internal container 12 with molded-on filling connector 30 and the filling connector 44, of the flexible inliner 28 welded thereto, can be seen in a fragmented illustration in FIG. 6. The flexible filling connector 44 by way of a narrow flange periphery 68 is on the one hand pulled taut on the upper side of the inliner 28 and upwardly on the external side, aligned to the correct positioning according to a "circular" marking (not visible), then push-fitted over the rigid filling connector 30, and by way of a larger annular weld seam 72 welded in a rotationally secure and gas-tight and liquid-tight manner on the internal side just below the end side of the rigid filling connector 30, whereupon the excess tubular piece of the flexible inliner filling connector 44 is cut off so as to be flush. In order to allow excess air to escape from the intermediate space between the inliner 28 and the plastics-material internal container 12 during inflation of the inliner, and/or in order for vacuum pumping from this intermediate space to be enabled, an additional container opening 64 is disposed at any suitable location in the upper base. The container opening 64 is preferably embodied as a 2-inch spout opening which is closable in a gas-tight and liquid-tight manner by way of a 2-inch spout plug, preferably having an inbuilt one-way valve. A vacuum/compressed-air pump is connected to the container opening 64 on demand.

Figure 7:
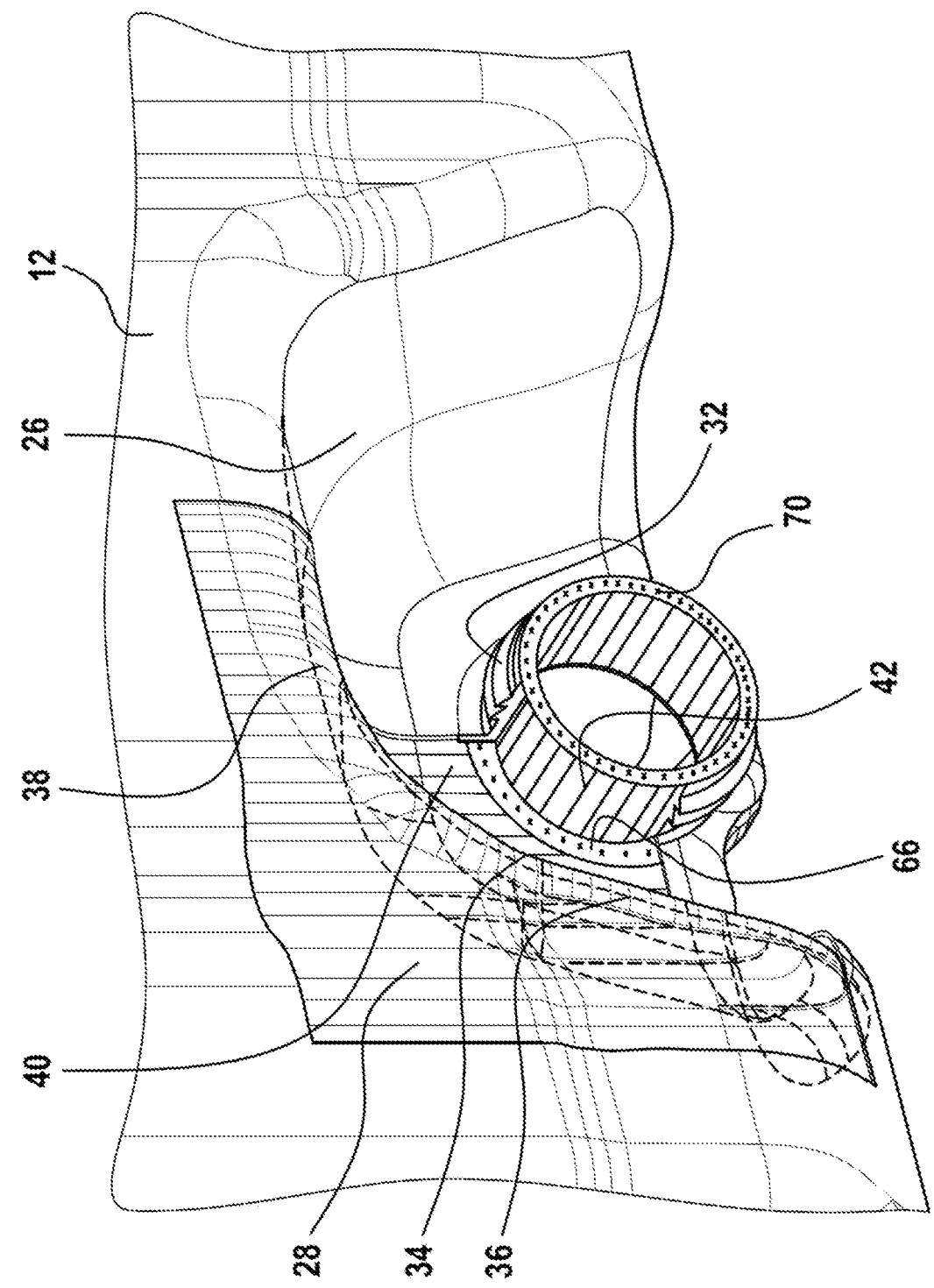
FIG. 7 shows a perspective view of a partial section around the region of the lower removal opening of the plastics-material internal container.

Finally, the removal region of the plastics-material internal container 12 having the molded rigid removal connector 32 and the removal connector 42, welded thereto on the end side, of the flexible inliner 28 can be seen in a fragmented illustration in FIG. 7.

For improved understanding, a rectangle has been cut out of the wall of the rigid plastics-material internal container 12 herein, wherein the section line runs through the removal connector 32, through the molded protective housing 26, and through a small piece of the front wall of the plastics-material internal container 12 such that the inliner 28 bearing thereon, having a curved wall recess 34, identified by a multiplicity of vertical lines, can be seen in the cut-out rectangle. The hidden left-hand rear part of the wall recess 34 is furthermore also indicated by dashed lines.

It can be clearly seen in the rectangular cut-out that the flexible removal connector 42 on the inside or on the rear side, respectively, by way of a narrow welded annular flange 66 is welded onto the rearward wall part 40 of the wall recess 34 of the inliner 28, and on the external side by way of a smaller end weld seam 70 is welded onto the end face of the rigid removal connector 32, in each case in a gas-tight and liquid-tight manner. It is important herein that the inliner 28 by way of the shape-adapted wall recess 34 thereof bears on the internal surface of the molding 26 of the rigid internal container 12 in a fully planar manner, like a second skin, as can be seen in FIG. 7, such that no intermediate spaces or cavities, respectively, whatsoever may remain therebetween, as has been the case to date with known IBCs having usual inliners.

A substantial advantage of the second-skin inliner lies in that the film bag does not require high tensile strength in relation to fluttering during filling or to-and-fro swashing of the liquid filling material during transportation movements, since no movement whatsoever of the inliner film material is performed herein, because the latter is vacuumed fixedly and durably on the internal side of the plastics-material internal container 12, as if adhesively bonded, so to speak. On account thereof, rupture-sensitive film materials having advanced barrier properties may also be used now.

The upper flexible filling connector 44 and the lower flexible removal connector 42 of the flexible inliner 28 are expediently produced from the same film material, having the same barrier properties, as the film material of the flexible inliner 28. Known inliners are often provided with filling connectors and removal connectors, having an integrally molded flange periphery for welding to the multi-layered composite film material of the inliner, that are prefabricated from thermoplastic plastics-material such as LDPE by the injection-molding method. These filling connectors and removal connectors are in most instances also configured so as to be somewhat thicker and more rigid. However, said connectors per se do not have any barrier properties. Inliners of this type, having filling connectors/ removal connectors that are produced by the injection-molding method are not suitable for oxygen-sensitive liquids, such as fragrances for the production of perfume, for example, or additives for the production of foodstuffs. By contrast, in the case of the inliner 28 according to the invention, the filling connectors/removal connectors (42, 44) are equipped with the same barrier properties as the inliner 28 per se, and disadvantageous diffusion procedures that penetrate the plastics material are precluded.

When an inliner according to the invention is used, only the contaminated inliner has to be disposed of after use in order for reconditioning to be achieved, said inliner, depending on the film thickness, for a 1000 liter IBC having a weight of only approx. 0.7 to 1.3 kg in terms of the plastics-material mass, excluding the filling-material contaminations, and a new inliner has to be inserted in order for the IBC to be reused. In the case of a replacement of the rigid internal container having a weight of approx. 14 kg, some EUR 35 in terms of production costs would have to be absorbed, while the replacement of an inliner accounts for costs of approx. EUR 15. The present invention thus offers a solution for the reuse of used IBCs that functions in flawless a manner, is cost-effective, and is material-preserving.

The invention claimed is:

1. A pallet container for storing and for transporting liquid or free-flowing filling materials having a thin-walled rigid internal container including a thermoplastic plastics material, having a tubular lattice frame, as a supporting jacket tightly enclosing the thin-walled rigid internal container, from welded-together horizontal and vertical tubular bars, and having a rectangular base pallet on which the thin-walled rigid internal container bears and to which the tubular lattice frame is fixedly connected, wherein the thin-walled rigid internal container has two longer side walls, a shorter rear wall, a shorter front wall, an upper base having a closable filling connector and a container base, wherein on a base side, in the center of the front wall, a lower removal region having a protective-housing-shaped molding, directed inward toward the inside of the thin-walled rigid internal container, for disposing a closable removal fitting in a protected recessed manner is provided, and wherein a cuboidal flexible inliner from a plastics-material film is inserted in the thin-walled rigid internal container, said inliner at the top being connected to the filling connector and at the bottom being connected to the removal connector having the removal fitting of the thin-walled rigid internal container, characterized in that the cuboid-shaped flexible inliner in the lower removal region has a corresponding wall recess, directed inward and corresponding with the protective-housing-shaped molding of the thin-walled rigid internal container, having two lateral wall parts, an upper wall part, and a rearward wall part having a flexible removal connector molded thereon, which is configured so as to bear completely in an exact fit on the internal surface of the molding that protrudes in a protective-housing manner into the interior of the thin-walled rigid internal container.

2. The pallet container as claimed in claim 1, characterized in that the cuboid-shaped flexible inliner is welded together from three blank panels, and comprises an upper horizontal lid part having a centric flexible filling connector, a lower horizontal base part having a clearance that corresponds with the base shape of the wall recess, and a vertically encircling side-wall blank panel having area portions for the two lateral wall parts, the upper wall part, and the rearward wall part of the wall recess of the inliner.

3. The pallet container as claimed in claim 1, characterized in that the three blank panels in each case are welded together by way of an upper weld seam and a lower weld seam that horizontally encircles an external edge of the upper lid part and an external edge of the lower base part, and for closing a side-wall blank panel are welded together by way of a weld seam that runs vertically from top to bottom in the center of the front wall and through the center of the wall recess.

4. The pallet container as claimed in claim 1, characterized in that the three blank panels in each case are welded together by way of an upper weld seam and a lower weld seam that horizontally encircles an external edge of the upper lid part and an external edge of the lower base part, and for closing a side-wall blank panel are welded together by way of a weld seam that runs vertically from top to bottom in the center of the rear wall, wherein a weld waste running vertically from top to bottom up to the wall recess is provided in the center of the front wall.

5. The pallet container as claimed in claim 1, characterized in that
a length of the upper horizontal weld seam is shorter than a length of the lower horizontal weld seam, or that an upper weld seam circumference (SNUo) of the upper lid part is shorter than a lower weld seam circumference (SNUu) of the lower base part.

6. The pallet container as claimed in claim 1, characterized in that
in the case of an inliner having a 1000 l filling material volume, a length of the upper horizontal weld seam, that is to say an upper weld seam circumference (SNUo) is 4100 mm-4150 mm, a length of the lower horizontal weld seam, that is to say a lower weld seam circumference (SNUu) is approx. 4265-4310 mm, and a front-side vertical weld seam is approximately 800-1100 mm long.

7. The pallet container as claimed in claim 1, characterized in that
the flexible inliner for a filling material volume of approx. 1000 l has a cuboid shape having a length (LI) of approx. 1150-1190 mm, a width (BI) of approx. 950-1050 mm, and a height (HI) of approx. 950-1050 mm, and that the wall of said inliner is welded together from three blank panels.

8. The pallet container as claimed in claim 1, characterized in that
the flexible inliner has an upper filling connector having a diameter of approx. 145 mm or 225 mm, and a length of approx. 290-310 mm, and a lower flexible removal connector having a diameter of approx. 2", 3", or 145 mm, and a length of at least 100 mm.

9. A pallet container for storing and for transporting liquid or free-flowing filling materials having a thin-walled rigid internal container including a thermoplastic plastics material, having a tubular lattice frame, as a supporting jacket tightly enclosing the thin-walled rigid internal container, from welded-together horizontal and vertical tubular bars, and having a rectangular base pallet on which the thin-walled rigid internal container bears and to which the tubular lattice frame is fixedly connected, wherein the thin-walled rigid internal container has two longer side walls, a shorter rear wall, a shorter front wall, an upper base having a closable filling connector and a container base, wherein on a base side, in the center of the front wall, a lower removal region having a protective-housing-shaped molding, directed inward toward the inside of the thin-walled rigid internal container, for disposing a closable removal fitting in a protected recessed manner is provided, and wherein a cuboidal flexible inliner from a plastics-material film is inserted in the thin-walled rigid internal container, said inliner at the top being connected to the filling connector and at the bottom being connected to the removal connector having the removal fitting of the thin-walled internal container, characterized in that
the cuboid-shaped flexible inliner in the lower removal region has a corresponding wall recess, directed inward to the protective-housing-shaped molding of the thin-walled rigid internal container, having two lateral wall parts, an upper wall part, and a rearward wall part having a flexible removal connector molded thereon, which is configured so as to bear completely in an exact fit on the internal surface of the molding that protrudes in a protective-housing manner into the interior of the thin-walled rigid internal container, and
a further container opening that is closable in a gas-tight and liquid-tight manner is provided in the upper base of the thin-walled rigid internal container.

10. The pallet container as claimed in claim 9, characterized in that
the further closable container opening is configured as a 2-inch spout opening that is closable in a gas-tight and liquid-tight manner by means of a 2-inch spout plug, and is provided for the connection of one or more of a compressed air pump or a vacuum pump.

11. The pallet container as claimed in claim 10, characterized in that
the flexible inliner by way of the upper filling connector thereof is welded in a materially integral manner to the upper filling connector of the rigid plastics-material internal container, and by way of the lower flexible removal connector thereof is welded in a materially integral manner to the lower removal connector of the rigid plastics-material internal container, in each case in a gas-tight and liquid-tight manner, while the entire external surface of the inserted inliner is operatively connected to the entire internal surface of the plastics-material internal container in a force-fitting manner.

12. A method for inserting a new inliner into a pallet container as claimed in claim 11, characterized in that
the inliner after insertion and welding to the rigid filling connector and removal connector of the plastics-material internal container is inflated using compressed air, and excess air is removed without residue by vacuum pumps from the intermediate space between the external surface of the inliner and the internal surface of the plastics-material internal container until no air and no intermediate space remains between the inliner and the plastics-material internal container such that a stable vacuum is set, said vacuum, upon gas-tight closure of the container opening by way of which the excess air has been evacuated, being durably maintained during the entire intended use of the pallet container until the next replacement of the used inliner.

13. The pallet container as claimed in claim 12 characterized in that
the upper flexible filling connector and the lower flexible removal connector of the flexible inliner are produced as a tubular film from the same multi-layered composite film material having the same barrier properties as the multi-layered composite film material of the flexible inliner.

* * * * *